United States Patent
Lee et al.

(10) Patent No.: US 11,494,437 B1
(45) Date of Patent: Nov. 8, 2022

(54) SYSTEM AND METHOD FOR PERFORMING OBJECT-MODIFYING COMMANDS IN AN UNSTRUCTURED STORAGE SERVICE

(71) Applicant: Amazon Technologies, Inc., Seattle, WA (US)

(72) Inventors: Kerry Quintin Lee, Seattle, WA (US); Derek Ernest Denny-Brown, II, Seattle, WA (US); Varun Marupadi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 15/701,338

(22) Filed: Sep. 11, 2017

Related U.S. Application Data (63) Continuation of application No. 14/216,216, filed on Mar. 17, 2014, now Pat. No. 9,760,576, which is a
(Continued)

(51) Int. Cl.
  *G06F 16/93* (2019.01)
  *G06F 16/835* (2019.01)
  (Continued)

(52) U.S. Cl.
  CPC ............ *G06F 16/835* (2019.01); *G06F 16/17* (2019.01); *G06F 16/30* (2019.01); *G06F 16/345* (2019.01);
  (Continued)

(58) Field of Classification Search
  CPC .. G06F 17/30129; G06F 16/30; G06F 16/986; G06F 16/835; G06F 16/17; G06F 16/2456; G06F 16/33
  See application file for complete search history.

(56) References Cited

U.S. PATENT DOCUMENTS 6,606,698 B2   8/2003   Fradette
7,058,696 B1   6/2006   Phillips et al.
(Continued)

OTHER PUBLICATIONS

LexisNexis, "File Formats for Electronic Document Review: Why PDF Trumps TIFF", 6 pages. (Year: 2004).*
(Continued)

*Primary Examiner* — Brittany N Allen
(74) *Attorney, Agent, or Firm* — S. Scott Foster; Kowert, Hood, Munyon, Rankin & Goetzel, P.C.

(57) ABSTRACT

Embodiments of system and method for performing object-modifying commands in an unstructured storage service are described. Embodiments may include utilizing one or more nodes to implement an unstructured storage service including a service interface configured to service data storage requests and data retrieval requests from remote clients. The unstructured storage service is configured to isolate access to each of multiple storage domains of the service to different clients. Embodiments may also include receiving from a given remote client, a request to store a data object to a given storage domain of the service. The request further specifying a command to modify source data for the object prior to storing the object. Embodiments may also include using the unstructured storage service to perform the command without exporting the source data from the unstructured storage service to the given remote client prior to completion of the command.

20 Claims, 10 Drawing Sheets

Related U.S. Application Data continuation of application No. 13/216,100, filed on Aug. 23, 2011, now Pat. No. 8,682,942.

(51) Int. Cl.

| | | |
|---|---|---|
| *G06F 16/17* | (2019.01) | |
| *G06F 16/438* | (2019.01) | |
| *G06F 16/34* | (2019.01) | |
| *G06F 16/30* | (2019.01) | |
| G06F 16/33 | (2019.01) | |
| G06F 16/2455 | (2019.01) | |

(52) U.S. Cl.
CPC ...... *G06F 16/4387* (2019.01); *G06F 16/4393* (2019.01); *G06F 16/93* (2019.01); *G06F 16/2456* (2019.01); *G06F 16/33* (2019.01)

(56) References Cited

U.S. PATENT DOCUMENTS

| | | | |
|---|---|---|---|
| 7,146,356 B2* | 12/2006 | Choi ................. | G06F 16/24553 707/706 |
| 7,716,180 B2* | 5/2010 | Vermeulen ........ | H04L 29/06047 707/626 |
| 8,285,681 B2 | 10/2012 | Prahlad et al. | |
| 8,326,816 B2 | 12/2012 | Colle et al. | |
| 8,370,288 B2* | 2/2013 | Harris ................. | G06F 16/4393 706/54 |
| 8,554,745 B2 | 10/2013 | Pawar et al. | |
| 8,682,942 B1 | 3/2014 | Lee et al. | |
| 9,054,942 B1* | 6/2015 | De Temmerman ......................... | G06F 11/3495 |
| 9,110,837 B2 | 8/2015 | Patel et al. | |
| 9,253,166 B2 | 2/2016 | Gauda | |
| 9,760,576 B1 | 9/2017 | Lee et al. | |
| 2003/0046396 A1 | 3/2003 | Richter et al. | |
| 2005/0188403 A1* | 8/2005 | Kotzin ................. | G06F 16/4393 725/47 |
| 2006/0080616 A1* | 4/2006 | Vogel ...................... | G06F 9/451 715/769 |
| 2006/0112337 A1* | 5/2006 | Jung ...................... | G06F 16/739 715/723 |
| 2006/0129593 A1* | 6/2006 | Slovak ................... | G06Q 10/10 |
| 2009/0132510 A1* | 5/2009 | Dimitrova ............ | G11B 27/102 |
| 2010/0162100 A1* | 6/2010 | Portilla ................... | G06F 16/88 715/236 |
| 2010/0274772 A1 | 10/2010 | Samuels | |
| 2011/0238737 A1 | 9/2011 | Agrawal et al. | |
| 2011/0280476 A1* | 11/2011 | Berger .................... | G06T 11/60 382/163 |
| 2012/0089781 A1 | 4/2012 | Ranade et al. | |
| 2017/0139992 A1* | 5/2017 | Morin ..................... | G06F 16/80 |

OTHER PUBLICATIONS

Gottfrid, Derek, "Self-Service, Prorated Supercomputing Fun!", published Nov. 1, 2007, The New York Times, 3 pages. (Year: 2007).*

Zaharia, Matei, et al., "Improving MapReduce Performance in Heterogeneous Environments", published Aug. 19, 2008, Univ. of California at Berkeley, 16 pages. (Year: 2008).*

Bhowmick, Schema level Join processing in web databases, Singapore Management University, 1998 (Year: 1998).*

Bhowmick, Join processing in web databases, Singapore Management University, 1998 (Year: 1998).*

Sint et al., Combining Unstructured, Fully structured and Semi-Structured Information in Semantic Wikis, Jun. 1, 2009 (Year: 2009).*

"Amazon Elastic Compute Cloud: API Reference" Nov. 2009 Amazon Web Services LLC. pp. 1-605.

"Amazon Elastic Compute Cloud: Developer Guide" Nov. 2009 Amazon Web Services LLC. pp. 1-226.

Amazon Elastic Compute Cloud: Getting Started Guide Nov. 2009 Amazon Web Services LLC. pp. 1-27.

"Amazon Elastic Compute Cloud: User Guide" Nov. 2009 Amazon Web Services LLC. pp. 1-223.

"Amazon Elastic MapReduce: API Reference" Mar. 2009 Amazon Web Services, Inc. pp. 1-45.

"Amazon Elastic Map Reduce: Developer Guide" Mar. 2009 Amazon Web Services, Inc. pp. 1-485.

"Amazon Elastic MapReduce: Getting Started Guide" Mar. 2009 Amazon Web Services, Inc. pp. 1-36.

"Amazon Simple Storage Service: API Reference" Mar. 2006 Amazon Web Services, Inc. pp. 1-280.

"Amazon Simple Storage Service: Developer Guide" Mar. 2006 Amazon Web Services, Inc. pp. 1-491.

"Amazon Simple Storage Service: Getting Started Guide" Mar. 2006 Amazon Web Services, Inc. pp. 1-20.

"Amazon Simple Storage Service: Console User Guide" Mar. 2006 Amazon Web Services, Inc. pp. 1-62.

U.S. Appl. No. 13/216,100, filed Aug. 23, 2011, Kerry Q. Lee.

* cited by examiner

SYSTEM AND METHOD FOR PERFORMING OBJECT-MODIFYING COMMANDS IN AN UNSTRUCTURED STORAGE SERVICE

This application is a continuation of U.S. patent application Ser. No. 14/216,216, filed Mar. 17, 2014, now U.S. Pat. No. 9,760,576, which is a continuation of U.S. application Ser. No. 13/216,100, filed Aug. 23, 2011, now U.S. Pat. No. 8,682,942, which are hereby incorporated by reference in their entirety.

BACKGROUND

Many different computing applications rely on some type of storage medium for the persistent storage of various kinds of application data. For example, common office applications and multimedia applications generate and use application data of various types and formats, such as documents, spreadsheets, still images, audio and video data, among others. Frequently, such data is stored for repeated access or use on behalf of a user. For example, a user may wish to store and work with a number of documents or other data over a period of time, and may expect that the data will be readily available in a predictable state when needed.

In conventional computing systems, the storage medium used by applications for persistent application data storage is most commonly a magnetic fixed drive or "hard drive," although optical and solid-state storage devices are also used. Such devices are either integrated within a computer system that executes the applications or accessible to that system via a local peripheral interface or a network. Typically, devices that serve as application storage are managed by an operating system that manages device-level behavior to present a consistent storage interface, such as a file system interface, to various applications needing storage access.

Certain network-accessible storage services provide an alternative to the conventional storage. For example, a user may rely on a web service based storage service for much of their storage needs. The storage services may provide flexibility to the user in the form of scalability and reliability. For instance, web service based storage services may relieve users of the burden of managing and upgrading hardware storage resources (e.g., as a result of increased storage demands). Instead, these responsibilities may fall on the service provider. In these cases, instead of paying for actual storage hardware, users may pay the service provider a fee for using the storage service. Typically, web service based storage services offer command sets for non-manipulative actions on data, such as requests to store or retrieve data from the storage service.

While the system and method for performing object-modifying commands in an unstructured storage service is described herein by way of example for several embodiments and illustrative drawings, those skilled in the art will recognize that the system and method for performing object-modifying commands in an unstructured storage service is not limited to the embodiments or drawings described. It should be understood, that the drawings and detailed description thereto are not intended to limit the system and method for performing object-modifying commands in an unstructured storage service to the particular form disclosed, but on the contrary, the intention is to cover all modifications, equivalents and alternatives falling within the spirit and scope of the system and method for performing object-modifying commands in an unstructured storage service as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
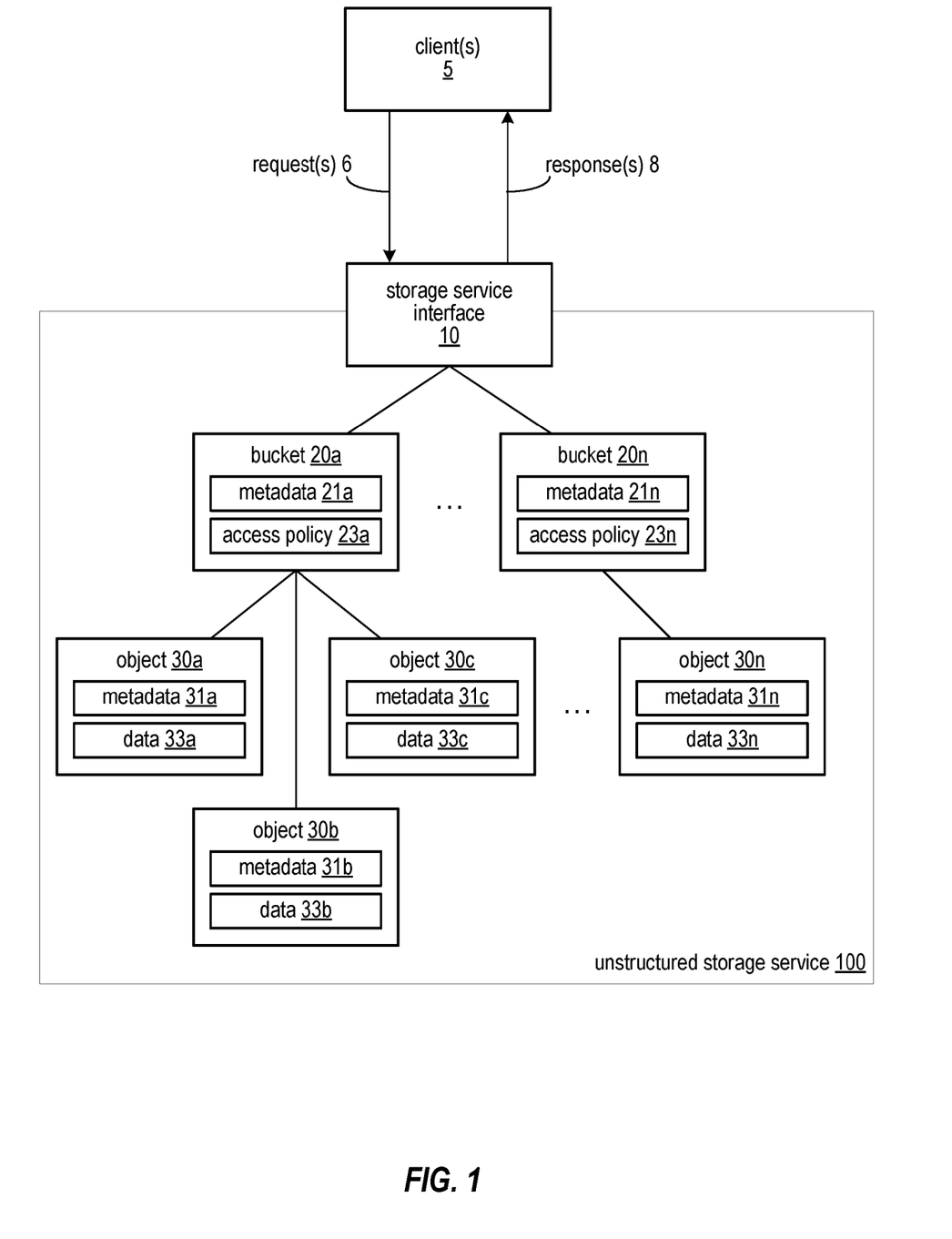
FIG. 1 illustrates a block diagram of an example storage model for an unstructured storage service, according to some embodiments.

Various embodiments of a system and method for performing object-modifying commands in an unstructured storage service are described. One embodiment of a storage model for providing data storage to users as a service, such as a web service, is illustrated in FIG. 1. In the illustrated model, storage service interface 10 is provided as a customer- or user-facing interface to unstructured storage service 100. According to the model presented to a user by interface 10, the storage service may be organized as an arbitrary number of buckets 20a-n accessible via interface 10. Each bucket 20 may be configured to store an arbitrary number of objects 30*a-n*, which in turn may store data specified by a user of the storage service. One or more users of clients 5 may submit requests to the storage service interface to store, retrieve, and, as described in more detail below, perform one or more operations on data object 30. Storage service interface may provide responses 8 to the requests, which may include acknowledgements and/or retrieved data, for example. Generally, in addition to storage and retrieval of data objects, the requests or commands that the unstructured storage service may perform may include commands that modify data within the unstructured storage service. In this way, the clients are not burdened with removing the data from the unstructured storage service, performing the operations, and then returning the modified data to the storage service. This configuration may save network bandwidth and processing resources for the clients, for example.

In some embodiments storage service interface 10 may be configured to support interaction between the storage service and its users according to a web services model. For example, in one embodiment, interface 10 may be accessible by clients as a web services endpoint having a Uniform Resource Locator (URL), e.g., http://storageservice.domain.com, to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

Web services may be implemented in a variety of architectural styles, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In some implementations, REST-style web services architectures are stateless, in that each web services call may contain all the information necessary to process that call without reference to external state information. In contrast to REST-style web services architectures, document-based or message-based web services architectures may encode the parameters and data pertinent to a web services call as a document that may be transmitted to a web services endpoint and then decoded and acted upon by the endpoint. For example, a version of eXtensible Markup Language (XML) or another suitable markup language may be used to format the web services request document. In some embodiments, the markup language used to format the request document may delimit parameters that control the processing of the request, while in other embodiments certain features of the markup language itself (e.g., certain tags) may directly control aspects of request processing. Additionally, in some embodiments, the resulting document may be encapsulated within another protocol, such as a version of the Simple Object Access Protocol (SOAP), for example, in order to facilitate processing of the web services request by the endpoint.

Other protocols may also be employed within various embodiments of web services architectures. For example, a version of Web Services Description Language (WSDL) may be employed by a web services endpoint to publish its interfacing requirements to potential clients. Web services endpoints may make themselves known to potential clients through a directory protocol such as a version of the Universal Description, Discovery and Integration (UDDI) protocol. Numerous other types of protocols relating to the provision of computing services via web services interfaces may exist, and any given web services implementation may use any suitable combination of such protocols.

It is contemplated that in some embodiments, interface 10 may support interfaces other than web services interfaces, instead of or in addition to a web services interface. For example, an enterprise may implement a storage service for use by clients external to the enterprise, who may access the service via web services protocols, as well as users within the enterprise, who may use a different type of interface (e.g., a proprietary interface customized to the enterprise's intranet). In some embodiments, interface 10 may support each of the various types of interfacing protocols through which any user of the storage service may access the service. In other embodiments, different instances of interface 10 may be provided for each distinct interface approach. It is noted that in some embodiments, those aspects of interface 10 related to handling interactions with clients (e.g., receiving and responding to service requests) may be implemented separately from those aspects that implement the general architecture of the storage service (e.g., the organization of the service into a hierarchy of buckets and objects). In some such embodiments, the portion of interface 10 relating to client interaction (e.g., via web services protocols) may be bypassed by certain users, such as those internal to an enterprise.

Figure 2:
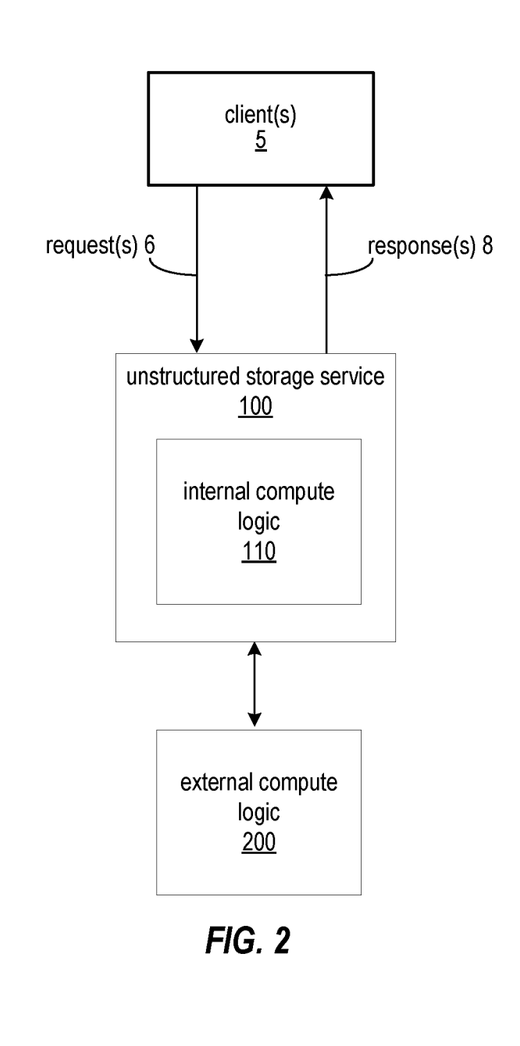
FIG. 2 illustrates a block diagram of an example system configuration for an unstructured storage service, according to some embodiments.

FIG. 2 illustrates both internal and external compute logic for servicing requests of the unstructured storage service. In various embodiments, the unstructured storage service may be configured to, for a given request, predict or estimate a measure of that request's computational intensity (e.g., in time or processing cycles). In cases where the measure of computational intensity is too large for the internal compute logic 110 (e.g., larger than some specified threshold), the unstructured storage service may offload one or more portions of the task to external compute logic 200, which may be implemented on another computer (e.g., as in FIG. 10) or on a dedicated piece of hardware, such as the random number generators described in later Figures. Generally, the commands that the internal and/or external compute logic perform may include commands that modify data within the unstructured storage service. In this way, the clients are not burdened with removing the data from the unstructured storage service, performing the operations, and then returning the modified data to the storage service. FIGS. 3A-8 illustrates example techniques for using the unstructured storage service, and in some cases external components, to process object modifying commands.

In various embodiments, the unstructured storage service may be configured to internally replicate data objects for data redundancy and resiliency purposes. After an operation is performed on a data object described herein, it may take some period of time for the change to propagate to all instances of the object. In various embodiments, clients may be made aware of this property, which may be referred to herein as eventual consistency. For instance, in an eventual consistency model, clients may be responsible for polling objects to determine that results have posted. In various embodiments, the time required for eventual consistency may be utilized to mask the computation time of the operations described herein. For instance, in some cases, inconsistencies caused by slow operations may be viewed by clients as a natural characteristic of the eventual consistency model.

In various embodiments, external compute logic 200 may undergo authentication in order to access the data associated with various clients. For instance, in some embodiments, the external compute logic may be issued a cryptographic key or other token for access to client data objects within the unstructured storage service.

In various embodiments, the unstructured storage service may also be configured to provide operation identifiers to enable clients to cancel pending requests. For instance, if requests processed by the unstructured storage service (or external compute logic) become stalled or some other anomaly occurs, clients may issue a cancel request command to cancel the pending operation. In various embodiments, the unstructured storage service may also include a metering component to determine costs associated with each client's use of the unstructured storage service. For instance, in various embodiments, clients may be charged for use of the unstructured storage service based on quantity of requests, quantity of data accessed, and/or the computational intensity of such requests.

Figure 3A:
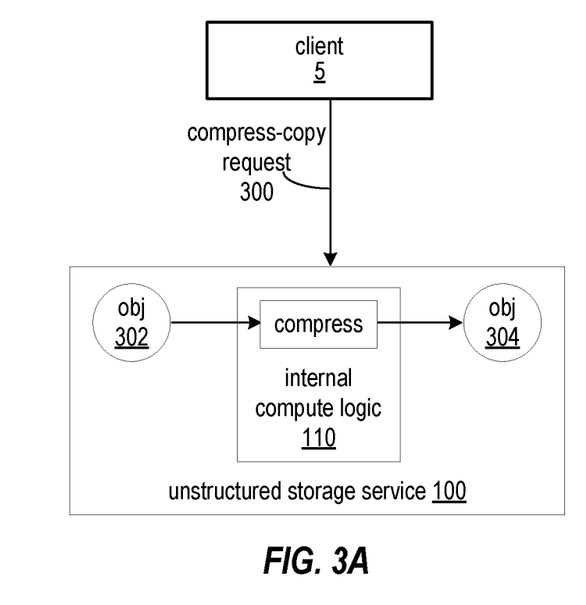
FIG. 3A illustrates a block diagram of an example compression command, according to some embodiments.
Figure 3B:
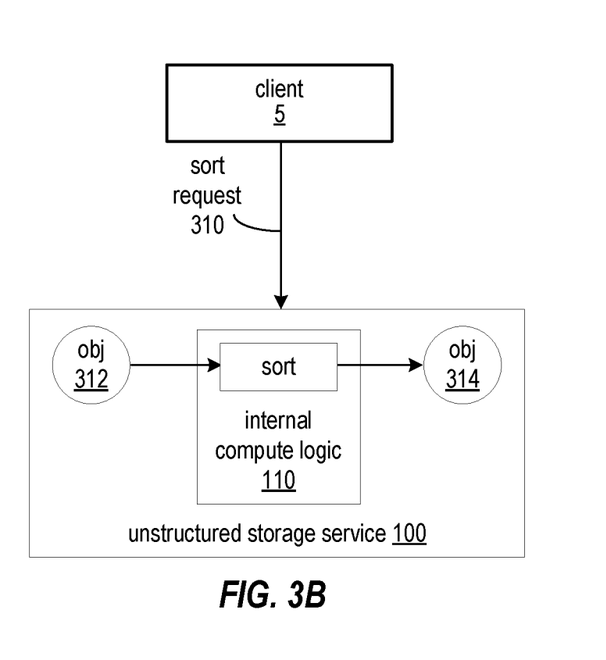
FIG. 3B illustrates a block diagram of an example sort command, according to some embodiments.
Figure 3C:
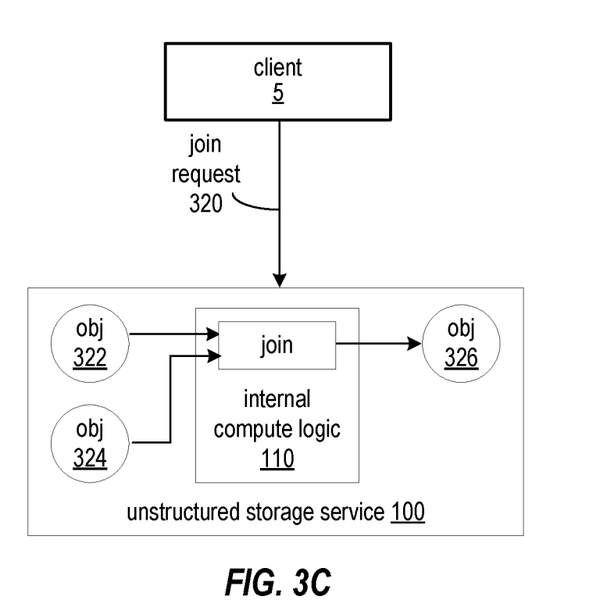
FIG. 3C illustrates a block diagram of an example join command, according to some embodiments.

FIG. 3A illustrates a request 300 to perform a copy with compression. For instance, in the illustrated embodiment, client 5 may submit the compress-copy request 300 to unstructured storage service 100. The request may specify source data for the compress-copy, which in this case may be object 302. Internal compute logic 110 may locate object 302 and perform one or more compression techniques on that object to create compressed object 304. In this way, the compressed object may be created without exporting the source data (e.g., object 302) to the client. FIG. 3B illustrates a request 310 to perform a sort operation to sort content of a data object within the unstructured storage service. For instance, in the illustrated embodiment, client 5 may submit the sort request 310 to unstructured storage service 100. The request may specify source data for the sort, which in this case may be data of object 312. Internal compute logic 110 may locate object 302 and perform one or more sorting techniques (e.g., alphanumeric sorting) on that object to create sorted object 314. In this way, the sorted object may be created without exporting the source data (e.g., object 312) to the client. FIG. 3C illustrates a request 320 to perform a join operation to join data of multiple objects within the unstructured storage service. For instance, in the illustrated embodiment, client 5 may submit the join request 320 to unstructured storage service 100. The request may specify source data for the sort, which in this case may be data of objects 322 and 324. Internal compute logic 110 may locate those objects and perform one or more joining techniques to create joined object 326. In this way, the joined object may be created without exporting the source data (e.g., objects 322 and 324) to the client. In the illustrated embodiment, only two objects are joined. However, embodiments need not be limited to joining only two objects. In some cases, sets of multiple objects may be joined together into a single object, for example.

In some embodiments, one or more filtering operations may be performed on a source object to identify some sub portion of the object that meets certain conditions. For instance, a search operation may be performed on text information of a source object to identify the locations of text (e.g., specific lines of text) that include a specified word or phrase. These locations (e.g., line numbers) may be stored within a data object made accessible to a requesting client. In various embodiments, the particular word(s) or phrases to search for may be specified by a filter command submitted by the remote client. As is the case for other commands described herein, the filter command may be specified by the client within a data storage request. The unstructured storage service may be configured to perform the filtering operations without exporting the source data that is being filtered to the client. One example of the filtering operations described herein may include a command similar to the "grep" command-line text-search utility of the Unix operating system.

Figure 4A:
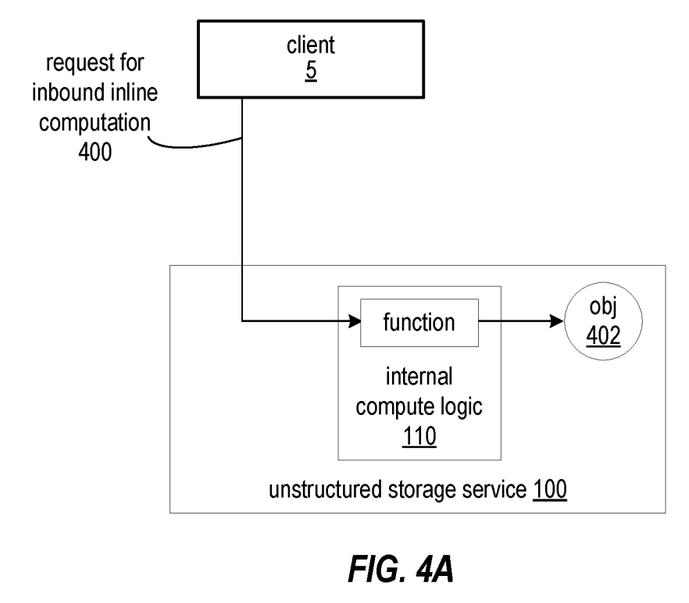
FIG. 4A illustrates a block diagram of an example inbound inline computation, according to some embodiments.
Figure 4B:
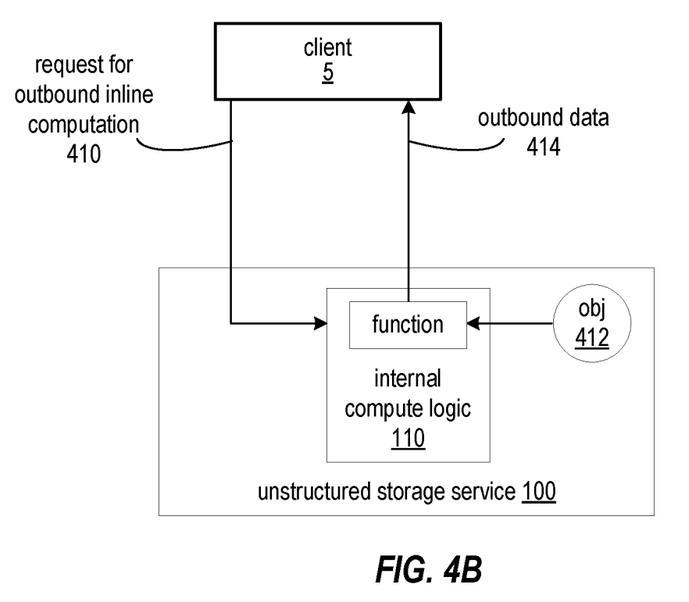
FIG. 4B illustrates a block diagram of an example outbound inline computation, according to some embodiments.

In various embodiments, the source data for a given object to be created need not be an existing object. For instance, in the illustrated embodiment of FIG. 4A, client 5 may provide data along with a request 400 to the unstructured storage service. The unstructured storage service may perform an inline computation on the data as it is received. For instance, the client may stream the data to the service, and the internal compute logic 110 may apply one or more functions (or other data-modifying operations) on the data as it is received (or after any necessary buffering) in order to generate object 402. In one example, internal compute logic may apply a video compression algorithm to video data provided by client 5. In FIG. 4B, the unstructured storage service may apply similar techniques to create outbound data. For instance, client 5 may submit request 410 to the unstructured storage service; the request may identify a data object to which a function (or other data-modifying operations) is to be applied. The unstructured storage service may provide the result of this function as outbound data 414. For instance, in one non-limiting example, client 5 may request that object 412 be encrypted and the result provided as outbound data 414. In various embodiments, outbound data 414 may be provided to client 5 without persisting a corresponding object for that data within the storage service. In other cases, in addition to providing the outbound data to client 5, the data may be persisted within the storage service.

Figure 5A:
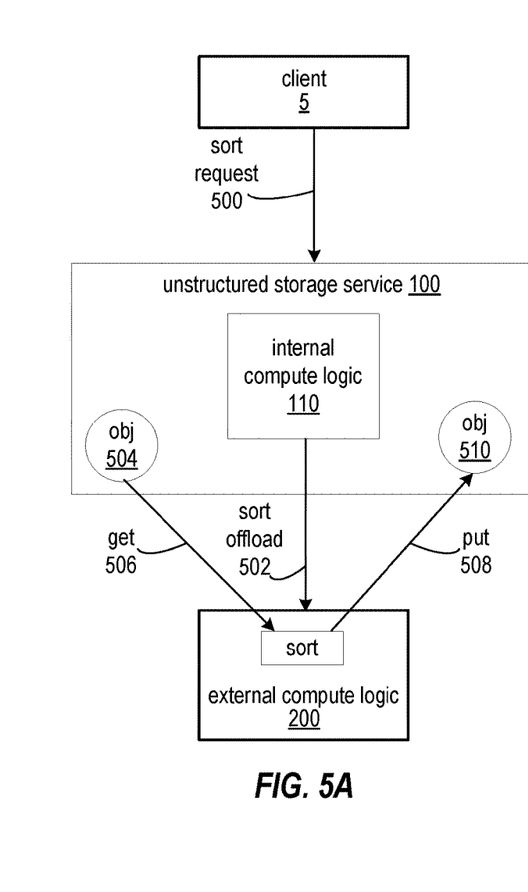
FIG. 5A illustrates a block diagram of an example sort command processed using external compute logic, according to some embodiments.

In various embodiments, one or more tasks of the unstructured storage service may be offloaded to external compute logic. For instance, the unstructured storage service may be configured to offload computationally intensive tasks to external systems. FIG. 5A illustrates one such example. In the illustrated embodiment, client 5 may provide a sort request 500 to unstructured storage service 100. In the illustrated embodiment, the unstructured storage service may be configured to, for a given request, predict or estimate a measure of that request's computational intensity (e.g., in time or processing cycles). In cases where the measure of computational intensity is too large for the internal compute logic 110 (e.g., larger than some specified threshold), the unstructured storage service may offload one or more portions of the task to external compute logic 200. For instance, in the illustrated example, sort request 500 may be a sort request directed to an object having a large quantity of data to be sorted. The external compute logic may be one or more nodes (e.g., computers, such as that of FIG. 10) or dedicated hardware devices (e.g., specialized hardware for encryption, compression, or random number generation). In some embodiments, external compute logic 200 may be one or more virtual instances of a computer system, which may also be provided as network-accessible service.

In cases where the unstructured storage service is to offload a request, internal compute logic may forward the original request or generate a new request, such as sort offload request 502. In the illustrated embodiment, external compute logic may receive the request, which may specify the object to be operated on as well as the commands to be performed on that object. In the illustrated embodiment, the command is a sort command directed to object 504. Accordingly, external compute logic 200 may sort data of object 504 to generate object 510. In various embodiments, to source object 504, external compute logic may issue a storage retrieval request to the unstructured storage service, as illustrated by get request 506. Similarly, to write the sorted object 510 to the unstructured storage service, external compute logic 200 may issue a put request 508 to the storage service.

Figure 5B:
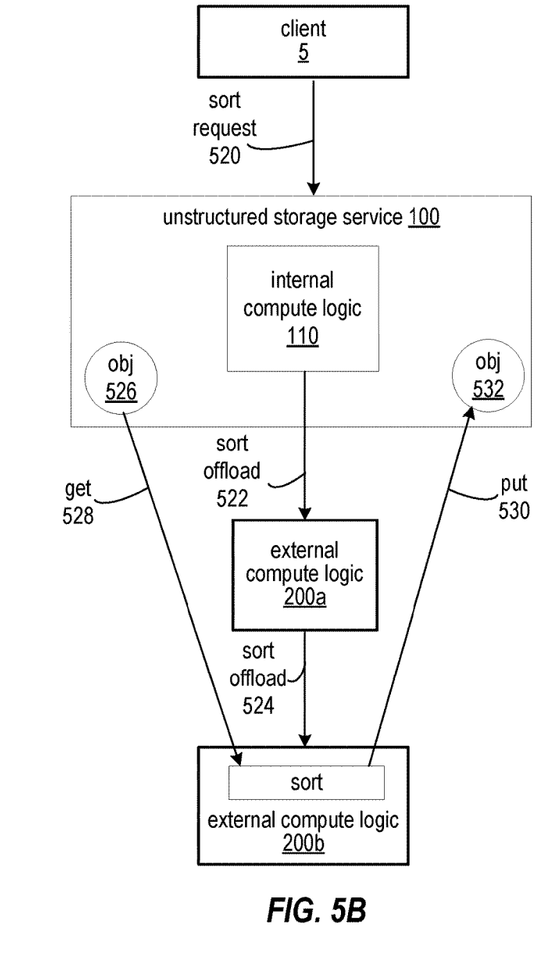
FIG. 5B illustrates a block diagram of an example of a computationally intensive sort command processed using external compute logic, according to some embodiments.

In various embodiments, very computationally intensive tasks may be offloaded from one external logic component to another. FIG. 5B illustrates one such example. In the illustrated embodiment, client 5 may provide a sort request 520 to unstructured storage service 100. In the illustrated embodiment, the unstructured storage service may be configured to, for a given request, predict or estimate a measure of that request's computational intensity (e.g., in time or processing cycles). In cases where the measure of computational intensity is too large for the internal compute logic 110 (e.g., larger than some specified threshold), the unstructured storage service may offload one or more portions of the task to external compute logic 200a. For instance, in the illustrated example, sort request 520 may be a sort request directed to an object having a large quantity of data to be sorted. As described above, the external compute logic may be one or more nodes or dedicated hardware devices. In some embodiments, external compute logic 200 may be one or more virtual instances of a computer system, which may also be provided as network-accessible service.

In cases where the unstructured storage service is to offload a request, internal compute logic may forward the original request or generate a new request, such as sort offload request 502. In the illustrated embodiment, external compute logic may receive the request, which may specify the object to be operated on as well as the commands to be performed on that object. In cases where the request is estimated or predicted to be more computationally intensive than external compute logic is rated to handle (e.g., according to a specified threshold), external compute logic 200a may offload the command to external compute logic 200b, which may be equipped to process the request. For instance, external compute logic 200b may represent a physical or virtual cluster of computers. In the illustrated embodiment, the command is a sort command directed to object 526. Accordingly, external compute logic 200b may sort data of object 526 to generate object 532. In various embodiments, to source object 526, external compute logic may issue a storage retrieval request to the unstructured storage service, as illustrated by get request 528. Similarly, to write the sorted object 532 to the unstructured storage service, external compute logic 200b may issue a put request 530 to the storage service.

Various embodiments may support built-in objects, such as objects created from data that is not sourced from the remote clients. For instance, in various embodiments, objects may be created that include random or pseudo-random data, timestamps, and other data internally generated by the unstructured storage service. In some cases, objects may be created from physical and virtual data sources, such as thermometers (or other telemetry data sources), network cameras, or a national debt clock, for example. In various embodiments, the unstructured storage service may generate objects that specify characteristics or states of the storage service itself. For instance, in one example, clients may request an object listing for a specific domain of the storage service (e.g., similar to a directory listing). In response, the unstructured storage service may dynamically generate an object (e.g., "on-the-fly") that includes information listing the objects stored within that storage domain. In other examples, the unstructured storage service may generate an object that includes information about some other state of the unstructured storage service. For instance, a client may request the state of an ongoing command or computation. In response, the unstructured storage service may dynamically generate an object that includes information that specifies the progress or state of an ongoing computation. As described above, the unstructured storage service may include a metering component configured to determine a cost associated with performing computations for commands. In various embodiments, clients may request a data object that specifies the cost associated with an ongoing command (e.g., an operation on a large portion of data). In response, the unstructured storage service may dynamically generate an object that includes information that specifies the current cost (and/or a projected cost) of an ongoing computation.

Figure 6:
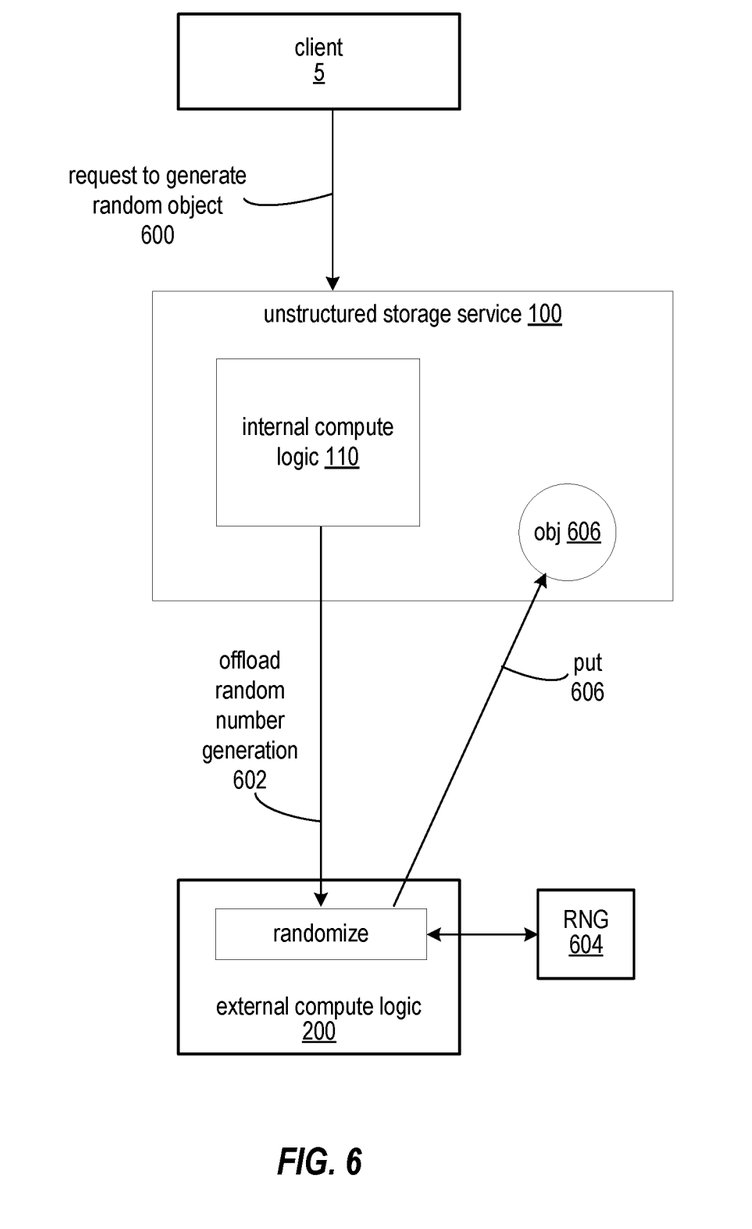
FIG. 6 illustrates a block diagram of an example command to generate an object including random data, according to some embodiments.

In some cases, the data source may be a dedicated portion of hardware, such as illustrated by the random number generator of FIG. 6. In FIG. 6, client 5 may issue a request to generate a random object 600 (e.g., an object that include one or more randomly or pseudo-randomly generated values). In response to the request, internal compute logic 110 may offload the request at 602 to external compute logic 200. External compute logic 200 may be configured to query a dedicate hardware random number generator (RNG) 604 in order to determine the data to be included within object 606, which is stored within the unstructured storage service at 606. In one non-limiting example, RNG 604 may be a Peripheral Component Interconnect (PCI) card including logic for randomly or pseudo-randomly generating data for objects. For example, RNG 604 may in some cases be a PCI card installed in a compute system on which external compute logic 200 executes.

Figure 7:
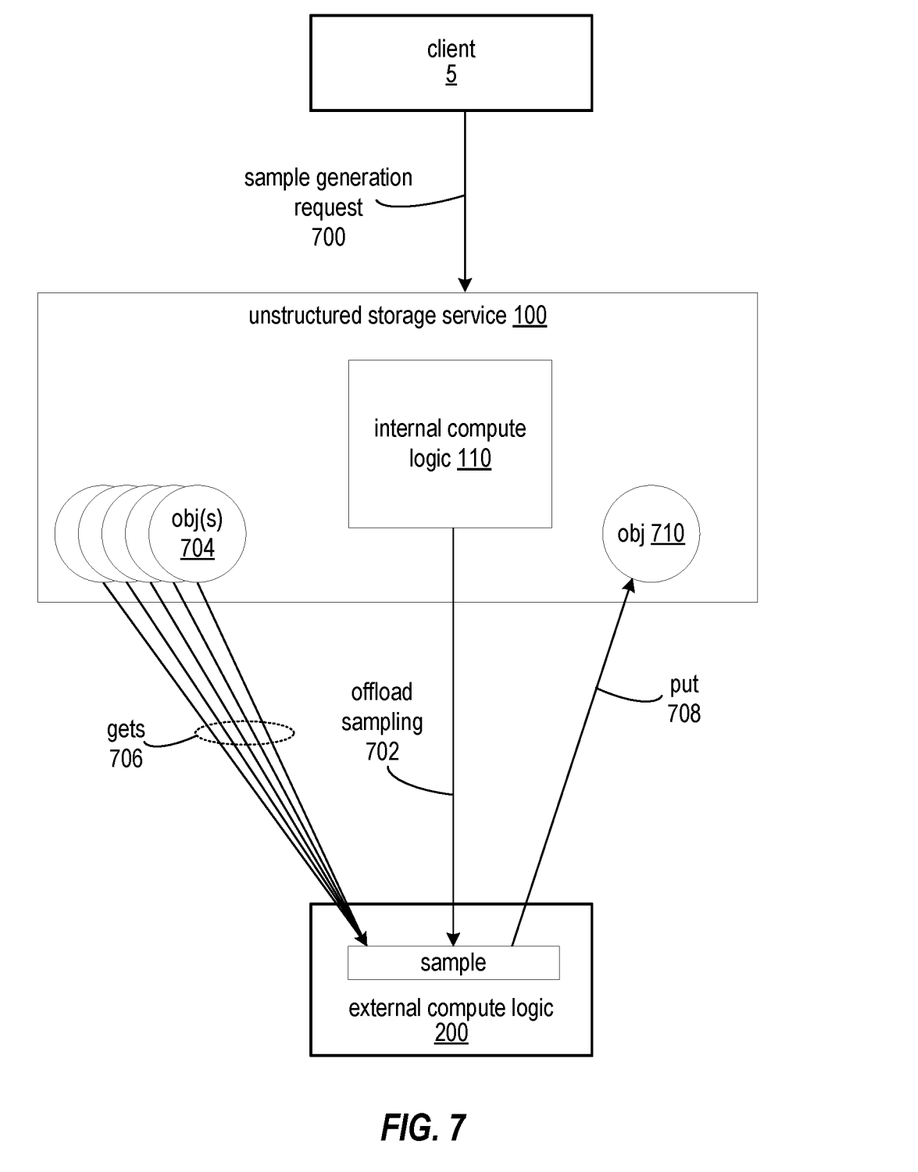
FIG. 7 illustrates a block diagram of an example command to sample multiple data objects, according to some embodiments.

In various embodiments, the unstructured storage service may be configured to perform one or more sampling operations, such as sampling text portions from multiple data objects, which may be combined into a single object. For instance, random samples of text may be sampled from multiple documents to perform a statistical analysis of natural language. FIG. 7 illustrates an example sampling operation. In the illustrated embodiment, client 5 may issue a sample generation request 700 to the unstructured storage service 100. Internal compute logic 110 may offload the request at 702 to external compute logic 200. External compute logic 200 may retrieve multiple objects from the unstructured storage service, as illustrated by multiple get operations 706. External compute logic may extract multiple samples from the retrieve objects and combine the samples into object 710. As illustrated, object 710 may be stored into unstructured storage service 100 at put operation 708.

Figure 8:
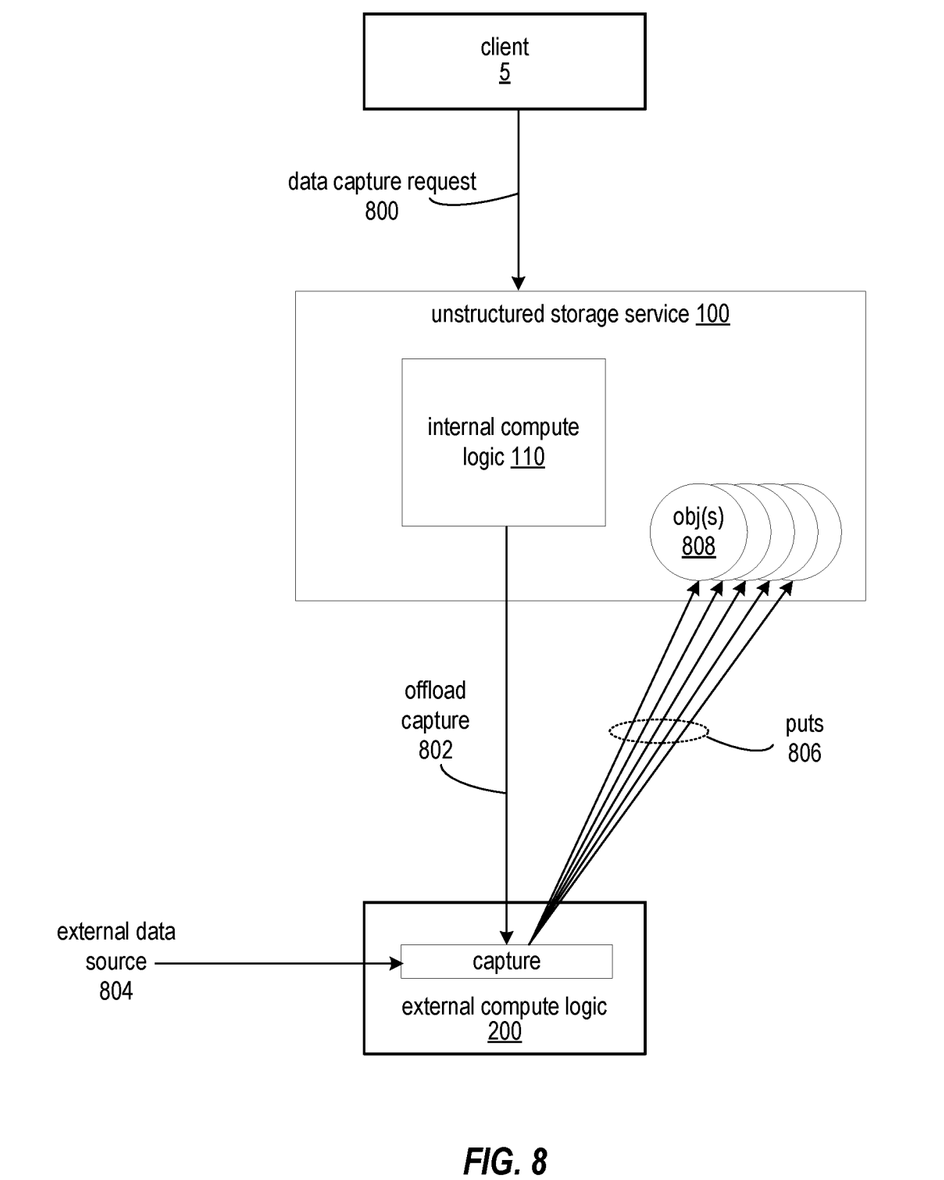
FIG. 8 illustrates a block diagram of an example command to sample data from an external source, according to some embodiments.

In various embodiments, data may be captured from external sources (other than clients), such as illustrated in FIG. 8. In the illustrated embodiment, client 5 may issue a data capture request 800 to the unstructured storage service 100. Internal compute logic 110 may offload the request at 802 to external compute logic 200. External compute logic 200 may retrieve multiple objects from an external data source, such as illustrated by external data source 804. For instance, in various embodiments, external data source 804 may represent a network accessible video camera or other source of live data. In some embodiments, the data captured from the external data source may include log data from other computer systems (e.g., logs of performance data, errors, or other metrics). External compute logic may extract multiple portions of the external data and store each portion as one of objects 808. As illustrated, objects 808 may be stored into unstructured storage service 100 at put operations 806. For example, in some embodiments, each object 808 may correspond to one minute of video captured from the aforesaid video source. In various embodiments, objects 808 may be implemented as a bound circular buffer storing the n-most portions of data from the external data source. In some embodiments, similar techniques may be applied to log objects.

Figure 9:
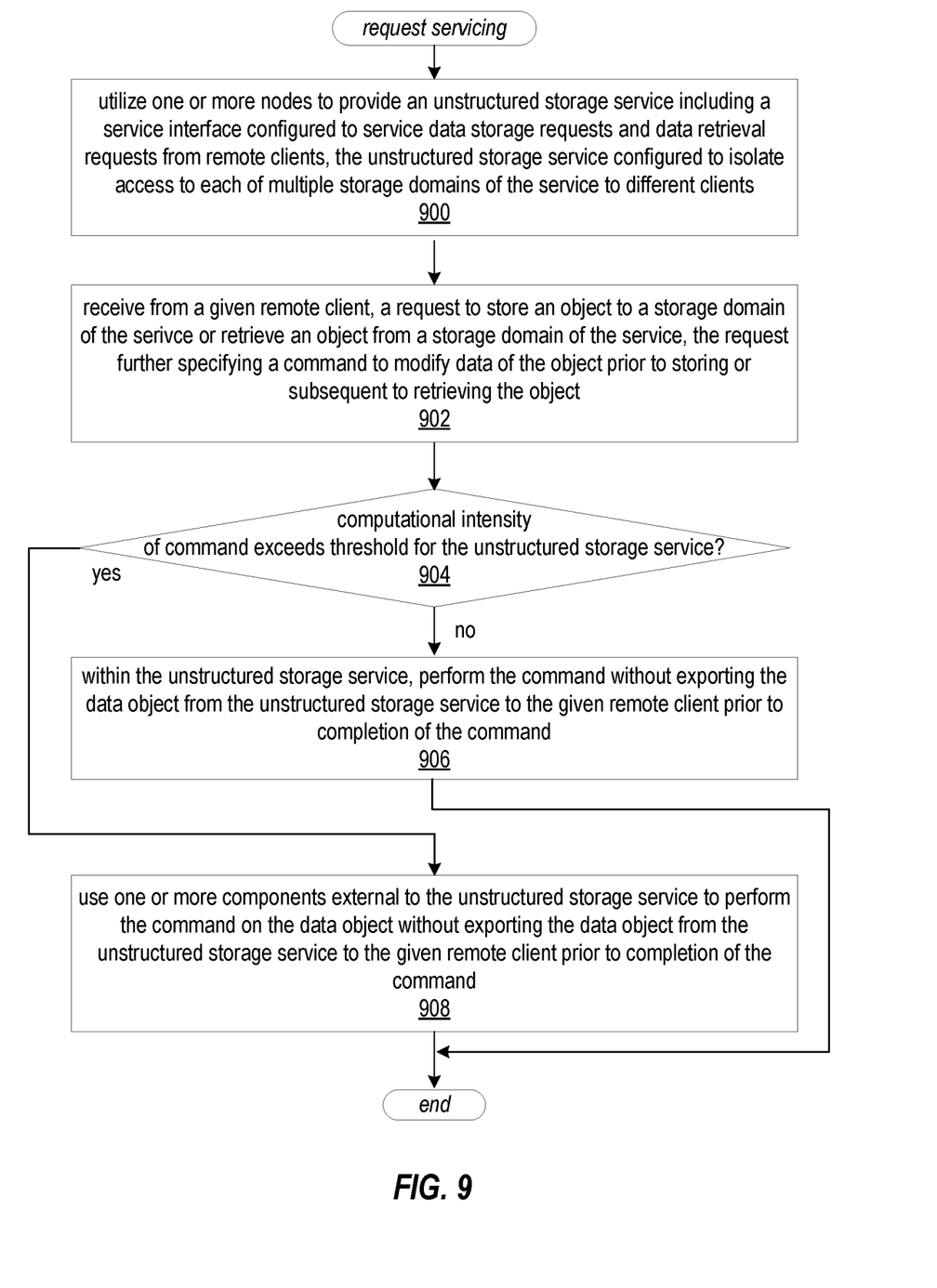
FIG. 9 illustrates a flowchart of an example method for using an unstructured storage service to perform a data-modifying command without exporting source data to a remote client prior to completion of the command, according to some embodiments.

FIG. 9 illustrates an example method for processing the requests described herein with an unstructured storage service, such as unstructured storage service 100 described herein. In various embodiments, the illustrated method may be performed by one or more nodes, such as computers configured similar to computer system 1000 described below.

As illustrated at block 900, the method may include using one or more nodes to implement an unstructured storage service including a service interface configured to service data storage requests and data retrieval requests from remote clients. Furthermore, in various embodiments, the unstructured storage service is configured to isolate access to each of multiple storage domains of the service to respective clients. For instance, in various embodiments, this portion of the method may include providing an unstructured storage service similar to unstructured storage service 100 described above.

As illustrated at block 902, the method may also include receiving from a given remote client, a request to store a data object to a storage domain of the service or retrieve a data object from a storage domain of the service. In various embodiments, the request may further specify a command to modify data of the object prior to storing or subsequent to retrieving the object in accordance with the request. For instance, this type of request may include any of the client requests described above with respect to FIGS. 3A-8.

As illustrated at block 904, the method may include determining whether a measure of computational intensity of the command exceeds a threshold value of computational intensity for the unstructured storage service. For instance, in various embodiments, the method may include, for a given request, predict or estimate a measure of that request's computational intensity (e.g., in time or processing cycles). As noted by the negative output of block 904, if the measure of computational intensity does not exceed the threshold value, the method may include performing the command within the unstructured storage service without exporting the data object from the unstructured storage service to the given remote client prior to completion of the command (block 906). For instance, as described above with respect to internal and external compute logic, the internal compute logic of the unstructured storage service may perform commands (e.g., sort, compress, etc.) if the command's computational intensity of the command does not exceed the aforesaid threshold. As illustrated by the positive output of block 904, if the measure of computational intensity exceeds the threshold value, the method may include using one or more components external to the unstructured storage service to perform the command on the data object without exporting the data object from the unstructured storage service to the given remote client prior to completion of the command (e.g., block 908). For instance, as described above with respect to internal and external compute logic, the external compute logic of the unstructured storage service may perform commands (e.g., sort, compress, etc.) if the command's computational intensity of the command does exceed the aforesaid threshold. In this way, the clients are not burdened with removing the data from the unstructured storage service, performing the operations, and then returning the modified data to the storage service. In various embodiments, this technique may save network bandwidth and processing resources for the clients, for example.

In various embodiments of the method, the service interface may be a web service interface accessible to the remote clients over the Internet or other communication network. For instance, requests and commands for that interface may be defined by an application programming interface (API) for that web service interface. In various embodiments of the method, the storage requests handled may include HTTP PUT commands, and the storage retrieval requests may include HTTP GET commands.

In various embodiments of the method, different types of requests may be handled. For instance, embodiments may include servicing requests for text manipulation operations (e.g., text searching, text substituting, text sorting, text concatenation, etc), data compression, data encryption, data sorting, data joining, concatenation, searching, sampling, random number generation, or any other type of request described herein. In various embodiments, embodiments may include data that may be formed in to various visual representations (e.g., graphs, plots, etc.). Embodiments may include providing this data to clients in tabular or graphical form. In various embodiments, the request described herein may be requests to perform numeric calculation, such as sum, average, median, and standard deviation.

Example Computer System

Various embodiments of the system and method for performing object-modifying commands in an unstructured storage service, as described herein, may be executed on one or more computer systems, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

Figure 10:
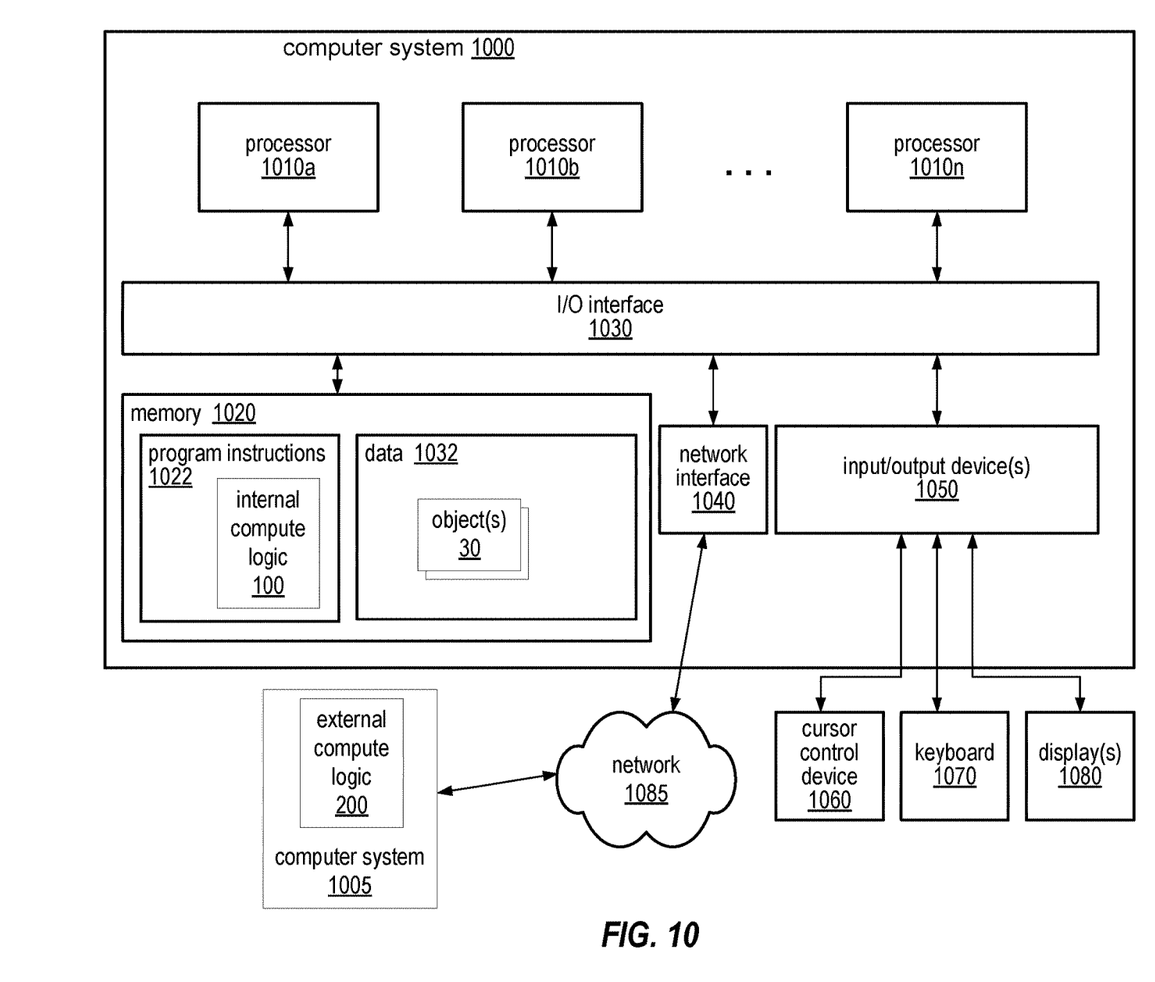
FIG. 10 illustrates one example of a computer system suitable for implementing various elements of the system and method for performing object-modifying commands in an unstructured storage service, according to some embodiments.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement any functionality of internal compute logic 110 described above. Additionally, data 1032 of memory 1020 may store any of the information or data structures described above, including but not limited to data objects 30. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system. In some embodiments, computer system 1005, on which external compute logic 200 may be implemented, may also be configured similar to computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., a computer on which external logic 200 is implemented) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above, such as the methods illustrated by FIG. 9. In other embodiments, different elements and data may be included. Note that data 1032 may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
storing two or more data objects, respectively comprising text, in a specified storage domain of an unstructured data storage service responsive to one or more requests to store the two or more data objects received over a network via a service interface for the unstructured data storage service;
receiving, over the network via the service interface for the unstructured data storage service, a request that specifies the two or more data objects and causes a task that joins the respective text of the two or more data objects stored in the storage domain of the unstructured data storage service from a client, wherein the request is specified according to an application programming interface (API) for the service interface;
in response to receiving the request:
locating the two or more data objects in the storage domain of the unstructured data storage service;
instructing one or more nodes to access the respective text of the two or more data objects in the storage domain of the unstructured data storage service to perform at least that portion of the task that joins the respective text of the two or more data objects; and
providing data in a tabular form generated from a result of performing the task that joins the respective text of the two or more data objects over the network to the client via the service interface.

2. The method of claim 1, wherein one of the data objects stores data in a different format than another one of the data objects.

3. The method of claim 1, wherein one or more other nodes implemented as part of the unstructured data storage service perform the receiving, the locating, the instructing, and the providing, and wherein the one or more nodes instructed to access the respective text of the two or more data objects in the unstructured data store to perform the portion of the task that joins the respective text of the two or more data objects are external to the unstructured data storage service.

4. The method of claim 1, further comprising:
determining that a measure of computational intensity of the portion of the task that joins the respective text of the two or more data objects exceeds a threshold value of computational intensity for one or more other nodes; and
performing the instructing in response to determining that the measure of computational intensity of the portion of the task that joins the respective text of the two or more data objects exceeds the threshold value of computational intensity for the one or more other nodes.

5. The method of claim 1, further comprising:
before completing the task, providing a state of the task to the client in response to a request for the state of the task received from the client.

6. The method of claim 1, wherein the task comprises one or more other operations in addition to the join of the respective text of the two or more data objects.

7. The method of claim 1, wherein at least one of the two or more data objects was stored from a source external to the unstructured data store before performing the portion of the task to join the respective text of the two or more data objects.

8. A system, comprising:
one or more computer nodes comprising at least one hardware computing device and configured to:
store two or more data objects, respectively comprising text, in a specified storage domain of an unstructured data storage service responsive to one or more requests to store the two or more data objects received over a network via a service interface for the unstructured data storage service;
receive, over a network via the service interface for the unstructured data storage service, a request that specifies the two or more data objects and causes a task that joins the respective text of the two or more data objects stored in the storage domain of the unstructured data storage service from a client, wherein the request is specified according to an application programming interface (API) for the service interface;
in response to the receipt of the request:
locate the two or more data objects in the storage domain of the unstructured data storage service;
instruct one or more other nodes to access the respective text of the two or more data objects in the storage domain of the unstructured data store to perform at least that portion of the task that joins the respective text of the two or more data objects; and
provide data in a tabular form generated from a result of performing the task that joins the respective text of the two or more data objects over the network to the client via the service interface.

9. The system of claim 8, wherein one of the data objects stores data in a different format than another one of the data objects.

10. The system of claim 8, wherein the one or more other nodes instructed to access the respective text of the two or more data objects in the unstructured data store to perform the portion of the task that joins the respective text of the two or more data objects are external to the unstructured data storage service.

11. The system of claim 8, wherein the one or more computer nodes are further configured to:
determine that a measure of computational intensity of the portion of the task that joins the respective text of the two or more data objects exceeds a threshold value of computational intensity for the one or more nodes; and
perform the instruction in response to determining that the measure of computational intensity of the portion of the task that joins the respective text of the two or more data objects exceeds the threshold value of computational intensity for the one or more nodes.

12. The system of claim 8, wherein the one or more computer nodes are further configured to:

before completing the task, provide a state of the task to the client in response to a request for the state of the task received from the client.

13. The system of claim 8, wherein the task comprises one or more other operations in addition to the join of the two or more data objects.

14. The system of claim 8, wherein at least one of the two or more data objects was stored from a source external to the unstructured data store before performing the portion of the task to join the two or more data objects.

15. A non-transitory, computer-readable storage medium storing program instructions that when executed on one or more computing devices cause the one or more computing devices to implement:
   storing two or more data objects, respectively comprising text, in a specified storage domain of an unstructured data storage service responsive to one or more requests to store the two or more data objects received over a network via a service interface for the unstructured data storage service;
   receiving, over the network via the service interface for the unstructured data storage service, a request that specifies the two or more data objects and causes a task that joins the respective text of the two or more data objects stored in the storage domain of the unstructured data storage service from a client, wherein the request is specified according to an application programming interface (API) for the service interface;
   in response to receiving the request:
      locating the two or more data objects in the storage domain of the unstructured data storage service;
      instructing one or more nodes to access the respective text of the two or more data objects in the storage domain of the unstructured data store to perform at least that portion of the task that joins the respective text of the two or more data objects; and
      providing data in a tabular format generated from a result of performing the task that joins the respective text of the two or more data objects over the network to the client via the service interface.

16. The non-transitory, computer-readable storage medium of claim 15, wherein one of the data objects stores data in a different format than another one of the data objects.

17. The non-transitory, computer-readable storage medium of claim 15, wherein the one or more computing devices are implemented as part of the unstructured data storage service, and wherein the one or more nodes instructed to access the respective text of the two or more data objects in the unstructured data store to perform the portion of the task that joins the respective text of the two or more data objects are external to the unstructured data storage service.

18. The non-transitory, computer-readable storage medium of claim 15, wherein the program instructions cause the one or more computing devices to further implement:
   determining that a measure of computational intensity of the portion of the task that joins the respective text of the two or more data objects exceeds a threshold value of computational intensity for one or more other nodes; and
   performing the instructing in response to determining that the measure of computational intensity of the portion of the task that joins the respective text of the two or more data objects exceeds the threshold value of computational intensity for the one or more other nodes.

19. The non-transitory, computer-readable storage medium of claim 15, wherein the program instructions cause the one or more computing devices to further implement:
   before completing the task, provide a state of the task to the client in response to a request for the state of the task received from the client.

20. The non-transitory, computer-readable storage medium of claim 15, wherein the task comprises one or more other operations in addition to the join of the respective text of the two or more data objects.

* * * * *